March 2, 1954 R. R. WILLIAMS 2,671,201

HIGH-FREQUENCY ANTENNA MATCHING DEVICE

Filed July 29, 1949 2 Sheets-Sheet 1

INVENTOR.
RALPH R. WILLIAMS
BY
McMorrow, Berman + Davidson
ATTORNEYS

HIGH-FREQUENCY ANTENNA MATCHING DEVICE

Filed July 29, 1949 2 Sheets-Sheet 2

INVENTOR.
RALPH R. WILLIAMS
BY
McMorrow, Berman + Davidson
ATTORNEYS

Patented Mar. 2, 1954

2,671,201

UNITED STATES PATENT OFFICE 2,671,201

HIGH-FREQUENCY ANTENNA MATCHING DEVICE

Ralph R. Williams, Detroit, Mich.

Application July 29, 1949, Serial No. 107,518

4 Claims. (Cl. 333—32)

This invention relates to radio receiver antenna systems, and more particularly to antenna matching means for use with high-frequency radio receivers, such as television receivers, FM receivers, and the like.

An object of the invention is to provide an antenna-matching unit which acts as a balancing means so that high-frequency receivers of various input circuit impedances of the balanced or unbalanced type may be matched with antenna systems of various impedances of the balanced or unbalanced type.

A further object of the invention is to provide a means for minimizing secondary images, known as "ghosts," and other electrical disturbances present in the input circuit of television receivers.

Further objects and advantages of the invention will become apparent from the following description and claims, and from the accompanying drawings, wherein:

Figure 1 is schematic wiring diagram of one form of antenna-matching system constructed in accordance with the present invention;

Figure 1–*a* is a schematic diagram illustrating a modification of the system of Figure 1;

In view of the fact that mis-match between the transmission line of an antenna system and the input circuit of a television receiver is one of the causes of "ghosts," it is the practice in the art to insert in the transmission line fixed resistors, in series and shunt, of predetermined values for each specific case, to match the antenna system with the input circuit of the television receiver. However, a given arrangement of this type is not adaptable to all types of receivers and antenna systems, since the input circuits of different receivers have different impedances, and different antenna systems also have different impedances. Furthermore, some receiver input circuits are of the balanced type, while others are of the unbalanced type, the same being true of different antenna systems. A given fixed arrangement as above described is particularly unsatisfactory when employing the electrical wiring system of a building as the signal collector. Therefore, it is a prime purpose of the present invention to provide an arrangement of the above type employing variable resistors, in conjunction with a ground connection, for suppressing "ghosts" under different receiver and antenna impedance conditions and different arrangements of the receiver input circuit and the antenna, as to balancing.

To prevent signal loss due to the use of pure resistance in the matching network, the invention also contemplates the use of coils in conjunction with the variable resistors and ground connection, whereby better results are obtained in the elimination of not only "ghosts" caused by mismatch, but also "ghosts" caused by multi-path transmission. The use of the coils, in the manner to be presently described, provides step-up of the desired signal and attenuation of undesired signals.

Figures 1, 1A, 2:
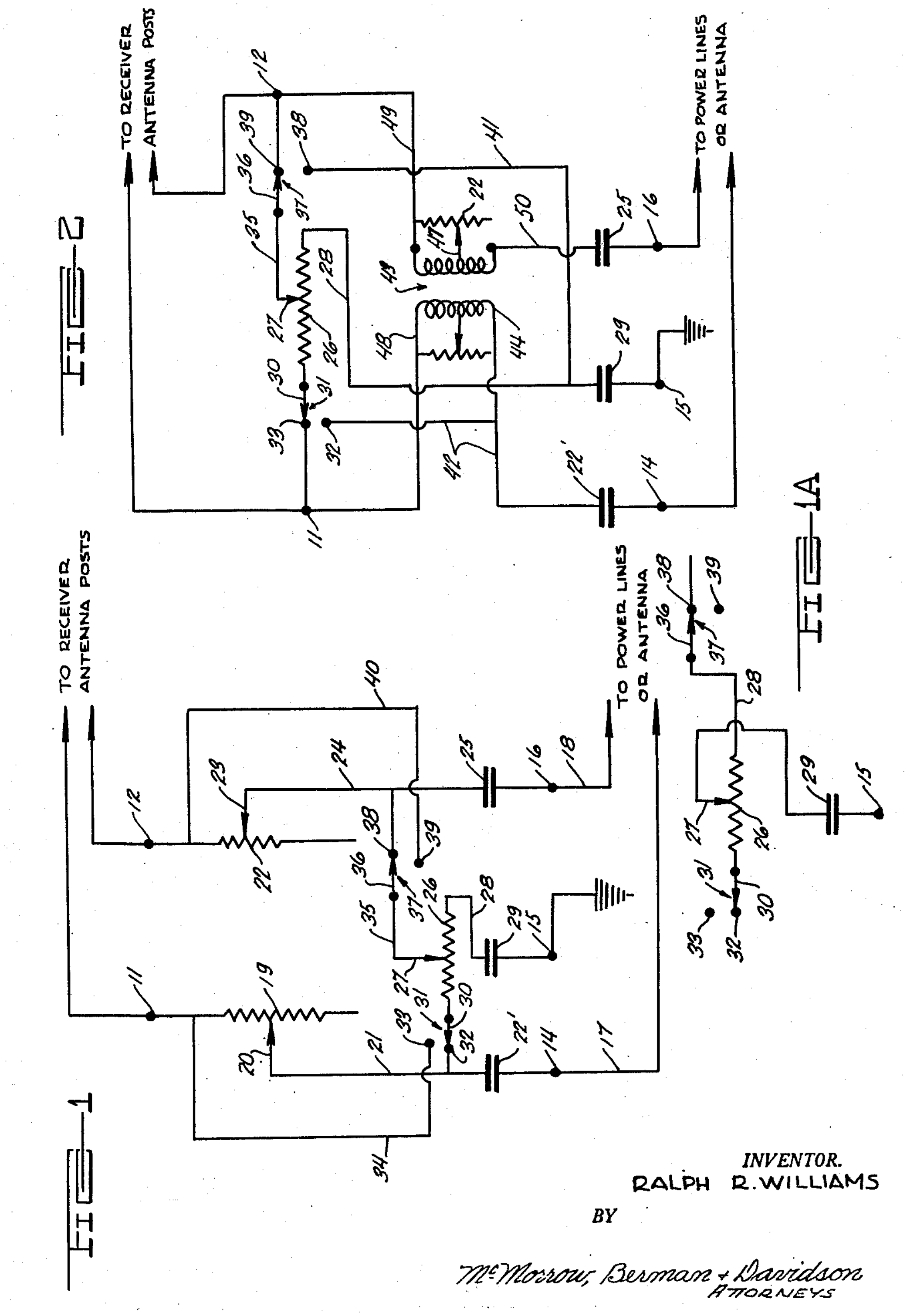
Figure 2 is a schematic wiring diagram illustrating another form of antenna system according to the present invention.

Referring now to the drawings, and more particularly to Figure 1, 11 and 12 designate the output terminals of the antenna-matching circuit, said terminals being connected, as indicated, to the receiver antenna posts. Designated at 14 and 16 are the respective input terminals, connected respectively to the transmisison line wires 17 and 18 leading to the antenna, or to the house wiring when said house wiring is employed in place of an antenna. Designated at 15 is another input terminal which is connected to ground.

Designated at 19 is a variable resistor having a movable tap 20. One of the fixed terminals of resistor 19 is connected to terminal 11. The tap 20 is connected by a wire 21 through a condenser 22′ to terminal 14. Designated at 22 is another variable resistor having a movable tap 23. One of the fixed terminals of resistor 22 is connected to terminal 12. The movable tap 23 is connected by a wire 24 through a condenser 25 to terminal 16.

Designated at 26 is another variable resistor having a movable tap 27. One fixed terminal of resistor 26 is connected by a wire 28 through a condenser 29 to the ground terminal 15. The other fixed terminal of resistor 26 is connected to the pole 30 of a single pole double-throw switch 31. One of the stationary contacts of switch 31, shown at 32, is connected to wire 21. The other stationary contact, indicated at 33, is connected by a wire 34 to the terminal 11. The movable tap 27 is connected by a wire 35 to the pole 36 of a single pole double-throw switch 37. One contact, shown at 38, of said switch is connected to wire 24. The other contact, shown at 39, is connected by a wire 40 to terminal 12.

The variable resistors 19, 22 and 26 may have any desired value. Preferably, however, said variable resistors each has a maximum value of 300 ohms. Condensers 22′, 25 and 29 are low-frequency blocking condensers and may be of the order of .00025 mfd., of the mica type, 220 volts working voltage. The condensers 22′ and 25 may be omitted where the device is used merely in the transmission line of an existing antenna system, not connected to the house lighting circuit.

In operation, the movable taps 20, 23 and 27 are adjusted until correct matching of the input circuit of the receiver, connected across terminals 11 and 12, to the antenna circuit, connected across terminals 14 and 16, is obtained. By means of the switches 31 and 37, the resistor 26 may be connected to the circuit on either side of the resistors 19 and 22, as desired. This may become necessary in balancing the various impedances of different antenna systems with the various impedances of the input circuits of various receivers.

As shown in Figure 1–*a*, the connections of tap 27 and terminal 28 of resistor 26 may be reversed from the connections shown in Figure 1, whereby wire 28 is connected to switch pole 36 and tap 27 is connected to the condenser 29.

Referring now to Figure 2, 11 and 12 again designate the output terminals of the device, said output terminals being connected to the receiver antenna posts. Designated at 26 is a variable resistor having a movable tap 27 connected by wire 35 to the pole 36 of a single-pole double-throw switch 37. One contact 39 of switch 37 is connected to terminal 12. The other contact 38 is connected by a wire 41 through condenser 29 to the ground terminal 15. One fixed terminal of resistor 26 is connected by a wire 28 through the condenser 29 to terminal 15. The other fixed terminal is connected to the pole 30 of a single-pole, double-throw switch 31. One contact 33 of switch 31 is connected to terminal 11. The other contact 32 is connected by a wire 42 through condenser 22′ to the terminal 14. Designated at 43 is a transformer comprising a first coil 44 and a second coil 45 in inductive relation with coil 44. Each coil may comprise 12 turns of 18-gauge wire wound on a ½-inch coil form. Coil 45 is preferably wound over said coil 44, although the coils may be wound on separate coil forms. The coils are center tapped, as shown at 46 and 47.

Designated at 19 and 22 are variable resistors similar to those employed in Figure 1. One terminal of coil 44 is connected by a wire 48 to terminal 11. The other terminal of said coil is connected to wire 42. The movable contact of resistor 19 is connected to the center tap 46. One fixed terminal of said resistor is connected to wire 48. One terminal of coil 45 is connected by a wire 49 to terminal 12. The other terminal of said coil is connected by a wire 50 through the condenser 25 to the terminal 16. The movable contact of resistor 22 is connected to the center tap 47. One fixed terminal of said resistor is connected to wire 49.

It will be seen that improved matching may be obtained because of the inductive reactance provided in the network by the transformer 43. The shunt resistor 26 may be connected by switch 31 to either terminal of the coil 44. Switch 37 allows the movable contact 27 of resistor 26 to be connected either to the terminal 12 or to wire 41, whereby said contact 27 is connected to ground through condenser 29. This, in effect, provides a variable shunt to ground of the receiver terminal 11, in one position of switch pole 30, or of the transmission line terminal 14 in the other position of switch pole 30.

Figure 3:
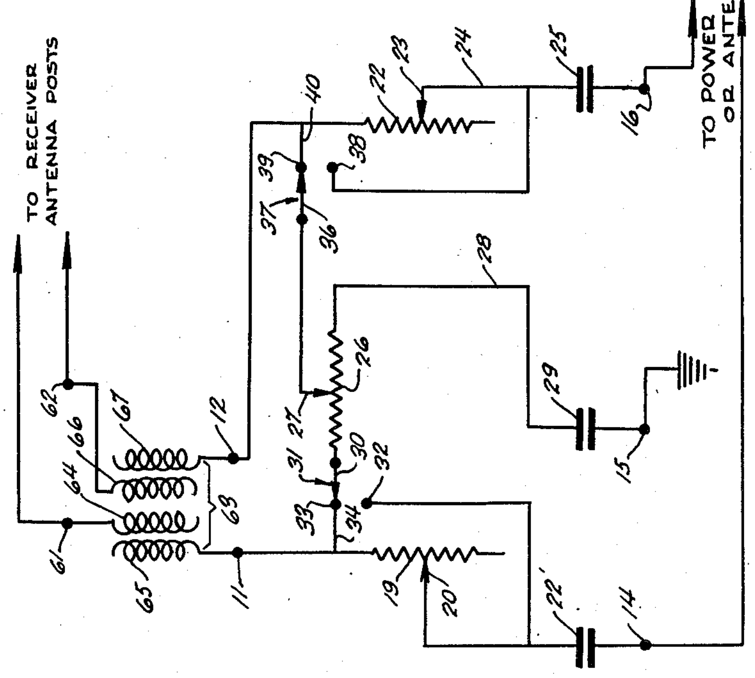
Figure 3 is a schematic wiring diagram illustrating still another form of antenna system according to the present invention.

Referring to Figure 3, 61 and 62 designate the output terminals of the device, said output terminals being connected to the receiver antenna posts. Between the terminals 61 and 62 and the terminals 11 and 12 of the circuit of Figure 1 is connected a transformer 63. Transformer 63 comprises a first pair of intermeshed windings 64 and 65 coupled with a second pair of intermeshed windings 66 and 67. Coils 64 and 65 are preferably intermeshed and wound on a ½-inch coil form. Coils 66 and 67 are intermeshed and wound over coils 64 and 65, although coils 64 and 65 may be intermeshed and wound on a separate coil form from coils 66 and 67. Coils 65 and 67 each has 6 turns and coils 64 and 66 each has 12 turns. All coils are wound with 18-gauge wire. One terminal of coil 64 is connected to terminal 61 and one terminal of coil 66 is connected to terminal 62. One terminal of coil 65 is connected to terminal 11 and one terminal of coil 67 is connected to terminal 12. The remainder of Figure 3 is identical with Figure 1.

Transformer 63 provides step-up of the signal voltage at terminals 11 and 12 and attenuates undesired electrical disturbances picked up by the antenna or other signal collector means connected to terminals 14 and 16.

Figure 4:
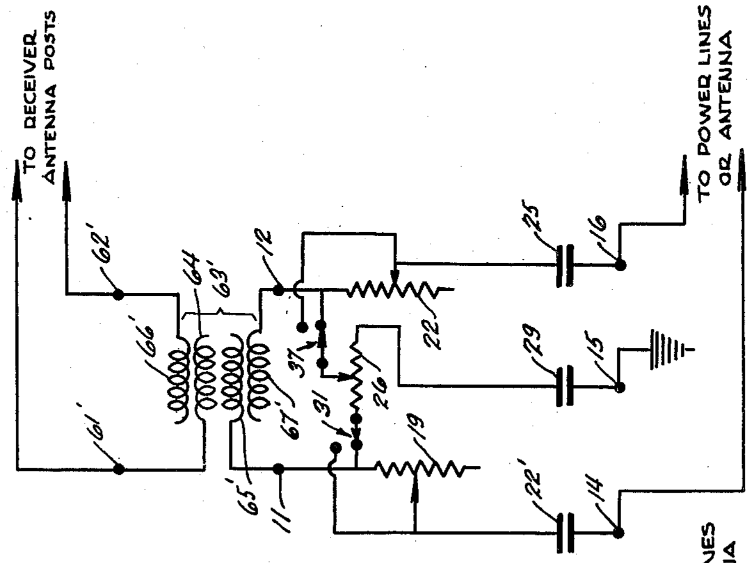
Figure 4 is a schematic wiring diagram similar to Figure 3, but illustrating a modification thereof.

Referring to Figure 4, a transformer 63′ is connected between the output terminals of the device, shown at 61′ and 62′ and the terminals 11 and 12 of the circuit of Figure 1. Transformer 63′ comprises windings 65′ and 67′ of 6 turns each intermeshed and wound on a ½-inch coil form. Intermeshed and wound over coils 65′ and 67′ are the coils 64′ and 66′ of 12 turns each, although coils 64′ and 66′ may be intermeshed and wound on a separate coil form. All coils are wound with 18-gauge wire. One terminal of coil 64′ is connected to terminal 61′. One terminal of coil 66′ is connected to terminal 62′. One terminal of coil 65′ is connected to terminal 11 and one terminal of coil 67′ is connected to terminal 12. The remainder of the circuit of Figure 4 is identical with Figure 1.

The effect of transformer 63′ is to step up the signal voltage at terminals 11 and 12 and to attenuate undesired electrical disturbances similar to the effect of transformer 63 in Figure 3.

While certain preferred values for the various circuit components have been disclosed herein, said values may be altered without departing from the spirit of the present invention. By suitably altering the said values, the device may be readily arranged for use with FM, AM and other receivers, as well as with television receivers.

While certain specific embodiments of the antenna systems for high-frequency radio receivers have been disclosed in the foregoing description, it is to be understood that various modifications within the spirit of the invention may occur to those skilled in the art. Therefore, it is intended that no limitations be placed on the invention except as defined by the scope of the appended claims.

What is claimed is:

1. A television antenna matching device of the character described comprising a pair of output terminals, a second pair of terminals adapted to be respectively connected to the transmission wires of a two-wire television antenna system, a first variable resistor connected between one of said pair of output terminals and one of said second pair of terminals, a second variable resistor connected between the other of said pair of output terminals and the other of said second pair of terminals, a third variable resistor having three terminals, said third variable resistor comprising a resistance element connected at its ends to two of said last-named terminals and a sliding tap engaging said resistance element and connected to the third of said last-named terminals, said first and second variable resistors and said resistance element having respective values of resistance of the same order as the impedance of the input circuit of a television receiver, said values being such that the variable resistors may be adjusted to obtain substantially an impedance match between the antenna transmission wires and the receiver input circuit, first switch means arranged to selectively connect one of the terminals of said third variable resistor to either terminal of the first variable resistor, second switch means arranged to selectively connect another of the terminals of the third resistor to either terminal of the second variable resistor and means connecting the third terminal of the third variable resistor to ground.

2. A television antenna matching device of the character described comprising a pair of output terminals, a second pair of terminals adapted to be respectively connected to the transmission wires of a two wire television antenna system, a first variable resistor connected between one of said pair of output terminals and one of said second pair of terminals, a first condenser connected in series with said first variable resistor between said one of said pair of output terminals and said one of said second pair of terminals, a second variable resistor connected between the other of said pair of output terminals and the other of said second pair of terminals, a second condenser connected in series with said second variable resistor between said other of said pair of output terminals and said other of said second pair of terminals, a third variable resistor having three terminals, said third variable resistor comprising a resistance element connected at its ends to two of said last-named terminals and a sliding tap engaging said resistance element and connected to the third of said last-named terminals, said first and second variable resistors and said resistance element having respective values of resistance of the same order as the impedance of the input circuit of a television receiver, said values being such that the variable resistors may be adjusted to obtain substantially an impedance match between the antenna transmission wires and the receiver input circuit, first switch means arranged to selectively connect one of the terminals of said third variable resistor to either terminal of the first variable resistor, second switch means arranged to selectively connect another of the terminals of the third variable resistor to either terminal of the second variable resistor, and circuit means, including a third condenser, connecting the remaining terminal of the third variable resistor to ground, said condensers having values of capacity to pass high frequencies and to block low frequencies.

3. A television antenna matching device of the character described comprising a pair of output terminals, a second pair of terminals adapted to be respectively connected to the transmission wires of a two-wire television antenna system, a first variable resistor connected between one of said pair of output terminals and one of said second pair of terminals, a second variable resistor connected between the other of said pair of output terminals and the other of said second pair of terminals, a third variable resistor having three terminals, said third variable resistor comprising a resistance element connected at its ends to two of said last-named terminals and a sliding tap engaging said resistance element and connected to the third of said last-named terminals, said first and second variable resistors and said resistance element having respective values of resistance of the same order as the impedance of the input circuit of a television receiver, said values being such that the variable resistors may be adjusted to obtain substantially an impedance match between the antenna transmission wires and the receiver input circuit, first switch means arranged to selectively connect one of the terminals of said third resistor to either terminal of the first variable resistor, second switch means arranged to selectively connect another of the terminals of the third variable resistor to either terminal of the second variable resistor, circuit means connecting the remaining terminal of the third variable resistor to ground, and a transformer connected to said output terminals.

4. A television antenna matching device of the character described comprising a pair of output terminals, a second pair of terminals adapted to be respectively connected to the transmission wires of a two-wire television antenna system, a first variable resistor connected between one of said pair of output terminals and one of said second pair of terminals, a first condenser connected in series with said first resistor between said one of said pair of output terminals and said one of said second pair of terminals, a second variable resistor connected between the other of said pair of output terminals and the other of said second pair of terminals, a second condenser connected in series with said second resistor between said other of said pair of output terminals and said other of said second pair of terminals, a third variable resistor having three terminals, said third variable resistor comprising a resistance element connected at its ends to two of said last-named terminals and a sliding tap engaging said resistance element and connected to the third of said last-named terminals, said first and second variable resistors and said resistance element having respective values of resistance of the same order as the impedance of the input circuit of a television receiver, said values being such that the variable resistors may be adjusted to obtain substantially an impedance match between the antenna transmission wires and the receiver input circuit, first switch means arranged to selectively connect one of the terminals of said third resistor to either terminal of the first variable resistor, second switch means arranged to selectively connect another of the terminals of the third resistor to either terminal of the second variable resistor, circuit means, including a third condenser, connecting the remaining terminal of the third variable resistor to ground, said condensers having values of capacity to pass high frequencies and to block low frequencies, and a transformer comprising four coils in inductive relation to each other, two of the coils being connected respectively to the pair of output terminals, and the remaining two coils being adapted to be respectively connected to the antenna posts of a television receiver.

RALPH R. WILLIAMS.

References Cited in the file of this patent

UNITED STATES PATENTS

| Number | Name | Date |
|---|---|---|
| 1,824,801 | Bouton | Sept. 29, 1931 |
| 1,937,796 | Smith et al. | Dec. 5, 1933 |
| 1,998,322 | Kaar | Apr. 16, 1935 |
| 2,213,054 | Schussler | Aug. 27, 1940 |
| 2,296,920 | Goodale | Sept. 29, 1942 |
| 2,515,436 | Babin | July 18, 1950 |